(12) United States Patent  (10) Patent No.: US 9,119,262 B2
Melanson et al.  (45) Date of Patent: Aug. 25, 2015

(54) BOOST AND LINEAR LED CONTROL

(71) Applicants: John L. Melanson, Austin, TX (US); William Draper, Austin, TX (US)

(72) Inventors: John L. Melanson, Austin, TX (US); William Draper, Austin, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/607,412

(22) Filed: Jan. 28, 2015

(65) Prior Publication Data

US 2015/0145427 A1  May 28, 2015

Related U.S. Application Data

(62) Division of application No. 13/289,816, filed on Nov. 4, 2011, now Pat. No. 9,018,851.

(60) Provisional application No. 61/410,259, filed on Nov. 4, 2010.

(51) Int. Cl.
  *H05B 33/08* (2006.01)
  *H05B 41/28* (2006.01)

(52) U.S. Cl.
  CPC ........ *H05B 33/0851* (2013.01); *H05B 33/0815* (2013.01); *H05B 33/0821* (2013.01); *H05B 41/28* (2013.01)

(58) Field of Classification Search
  USPC .............. 315/247, 291, 307–326, 185 S, 224
  See application file for complete search history.

(56) References Cited

U.S. PATENT DOCUMENTS

| | | | |
|---|---|---|---|
| 7,276,861 B1 * | 10/2007 | Shteynberg et al. | 315/291 |
| 7,804,256 B2 * | 9/2010 | Melanson | 315/291 |
| 2011/0115770 A1 * | 5/2011 | Seo et al. | 345/211 |

* cited by examiner

*Primary Examiner* — Tuyet Vo

(74) *Attorney, Agent, or Firm* — Brian F. Russell; Russell Ng PLLC

(57) ABSTRACT

A light emitting diode (LED) lighting system includes a switching power converter having an input for coupling to an alternating current (AC) power source, an output, and a switch. The LED lighting system also includes an LED lighting subsystem coupled to receive power from the output of the switching power converter. The LED lighting subsystem includes a current source for one or more LEDs, and the current source has a control node and a sense node. The LED lighting system additionally includes a switch state controller coupled to the switching power converter and coupled to the LED lighting subsystem. The switch state controller controls switching of the switch and varies a control current provided to the control node of the current source based on at least a parameter sensed from the sense node.

10 Claims, 3 Drawing Sheets

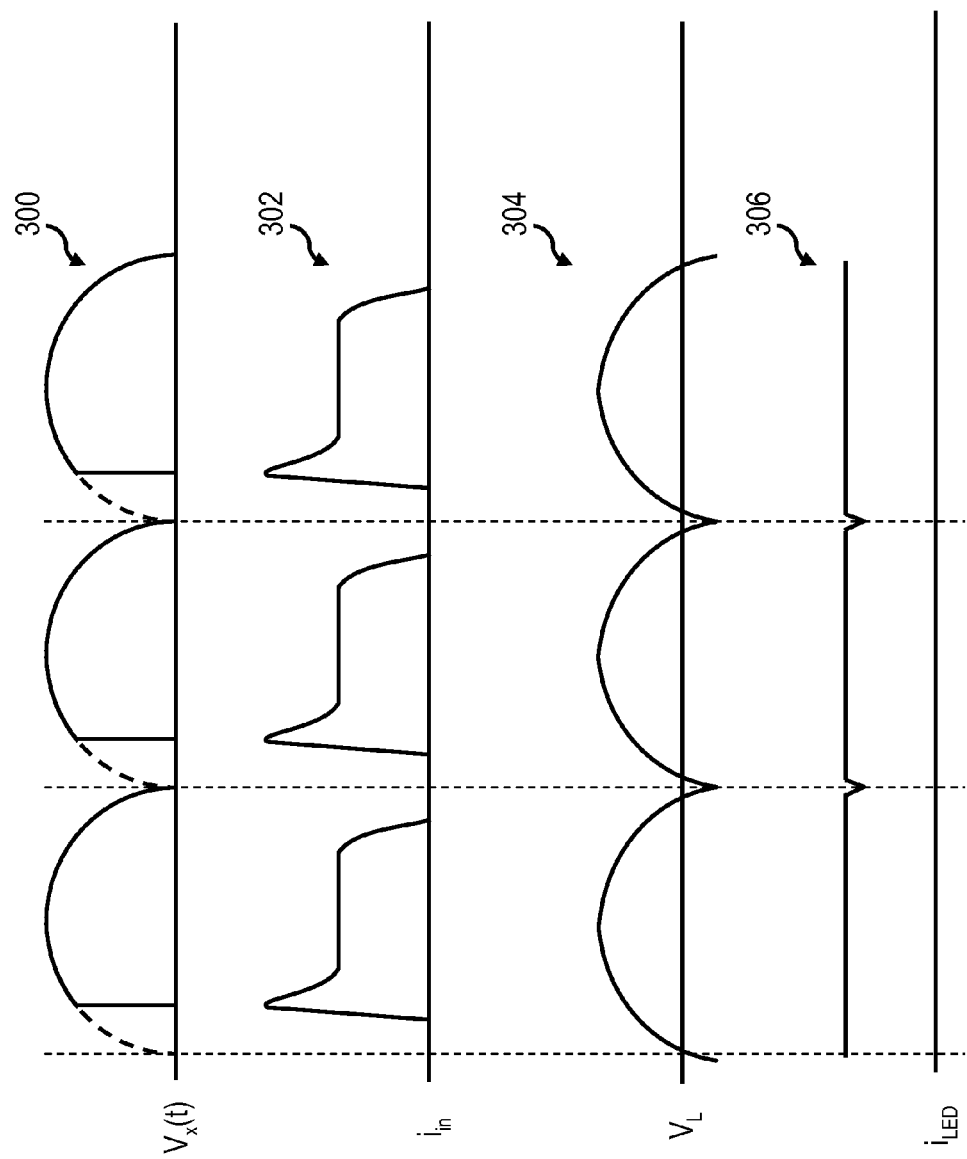

US 9,119,262 B2

BOOST AND LINEAR LED CONTROL

PRIORITY CLAIM AND CROSS-REFERENCE

This application claims the benefit under 35 U.S.C. §119(e) and 37 C.F.R. §1.78 of U.S. Provisional Application No. 61/410,259, filed Nov. 4, 2010, and entitled, "Boost and Linear LED Control," which is incorporated herein by reference.

The following additional U.S. patent applications are also incorporated herein by reference:

1. U.S. patent application Ser. No. 13/194,531, filed Jul. 29, 2011, and entitled, "Powering High-Efficiency Lighting Devices From a Triac-Based Dimmer;"
2. U.S. patent application Ser. No. 13/194,699, filed Jul. 29, 2011, and entitled, "Dimmer Compatibility with Reactive Loads;"
3. U.S. patent application Ser. No. 13/217,174, filed Aug. 24, 2011, and entitled, "Multi-Mode Dimmer Interfacing Including Attach State Control;"
4. U.S. Patent Application Ser. No. 61/376,504, filed Aug. 24, 2010, and entitled, "Multi-Mode Dimmer Interface for Lighting Boost Controller;"
5. U.S. Patent Application Ser. No. 61/410,168, filed Nov. 4, 2010, and entitled, "Dimmer Dump Circuits and Controls;"
6. U.S. Patent Application Ser. No. 61/410,269, filed Nov. 4, 2010, and entitled, "Dimmer Interface for Low Power Lamps;"
7. U.S. Patent Application Ser. No. 61/414,291, filed Nov. 16, 2010, and entitled, "Trailing Edge Boost Compatibility Circuit;
8. U.S. Patent Application Ser. No. 61/437,355, filed Jan. 28, 2011, and entitled, "Powering High-Efficiency Lighting Devices From a Triac-Based Dimmer;" and
9. U.S. Patent Application Ser. No. 61/503,369, filed Jun. 30, 2011, and entitled, "Dimmer Compatible LED Lamps with Secondary Side Current Control."
10. U.S. patent application Ser. No. 13/287,257, filed Nov. 2, 2011, and entitled, "Duty Factor Probing of a TRIAC-Based Dimmer; and"
11. U.S. patent application Ser. No. 13/287,257, filed on Nov. 2, 2011, and entitled, "Digital Resynthesis of Input Signal for Dimmer Compatibility." (U.S. Pat. No. 8,941,316)
12. U.S. patent application Ser. No. 13/289,816, filed Nov. 4, 2011, and entitled, "Boost and Linear Led Control."

BACKGROUND OF THE INVENTION

1. Technical Field

The present invention relates in general to the field of electronics and lighting, and more specifically, to a system and method for controlling and/or providing power to current regulated light sources, such as light emitting diode light sources.

2. Description of the Related Art

Commercially practical incandescent light bulbs have been available for over 100 years. Recently, other light sources have begun to show promise as commercially viable alternatives to the incandescent light bulb. For example, light emitting diodes (LEDs) are becoming particularly attractive as light sources in part because of long life, energy savings through high efficiency light output, and environmental incentives such as the reduction of use of mercury.

LEDs are semiconductor devices and are driven by direct current. The brightness of an LED varies in direct proportion to the current flowing through the LED. Thus, increasing current supplied to an LED increases the brightness of the LED, and decreasing current supplied to the LED dims the LED.

FIG. 1 illustrates a representative prior art LED lighting system 100, which includes a switching power converter 102. Voltage source 101 supplies an alternating current (AC) input voltage $V_{in}(t)$ to a full bridge rectifier 103. Voltage source 101 can be, for example, a public utility, and the AC voltage $V_{in}(t)$ is, for example, a 60 Hz/110 V line voltage in the United States of America or a 50 Hz/230 V line voltage in Europe. Full bridge rectifier 103 rectifies the input voltage $V_{in}(t)$ and supplies a rectified, time-varying, line input voltage $V_x(t)$ to switching power converter 102.

Switching power converter 102 includes a switch 108 that operates in response to a control signal $C_S$ to regulate the transfer of energy from the rectified, time-varying input voltage $V_x(t)$, through inductor 110 to capacitor 106. Switching power converter 102 additionally includes a diode 111 that prevents reverse current flow from capacitor 106 into inductor 110.

Energy transferred through inductor 110 is stored by capacitor 106. Capacitor 106 has sufficient capacitance to maintain an approximately constant voltage $V_C$ while providing current to a load, such as LED lighting subsystem 112. In at least some implementations, switching power converter 102 is a boost-type converter in which voltage $V_C$ is greater than the peak of input voltage $V_x(t)$.

In operation, input current $i_{in}$ varies over time, with a peak input current proportionate to the "on-time" of switch 108 and with the energy transferred to capacitor 106 proportionate to the "on-time" squared. Thus, this energy transfer process is one example of a nonlinear process. In some implementations, switch 108 is an n-channel field effect transistor (FET), and control signal $C_S$ is a pulse width modulated (PWM) control signal that causes switch 108 to conduct when the pulse width of $C_S$ is high. Thus, in such implementations, the "on-time" of switch 108 is determined by the pulse width of control signal $C_S$, and the energy transferred from $V_x(t)$ to capacitor 106 is proportionate to a square of the pulse width of control signal $C_S$.

Power control system 100 also includes a switch state controller 114 that generates control signal $C_S$ with a goal of causing switching power converter 102 to transfer a desired amount of energy to capacitor 106, and thus, to LED lighting subsystem 112. The desired amount of energy depends upon the voltage and current requirements of LED lighting subsystem 112. To provide power factor correction close to one, switch state controller 114 generally seeks to control input current $i_{in}$ so that input current $i_{in}$ tracks input voltage $V_x(t)$ while holding capacitor voltage $V_C$ substantially constant.

In practical systems, however, link voltage $V_L$ is subject to ripple, which can cause visible flicker in the LEDs of the LED lighting subsystem 112. Such flicker will become even more severe if LED lighting system 100 includes a phase-cut dimmer to dim the LEDs of LED lighting subsystem 112. The present application recognizes that it would be desirable to efficiently operate an LED lighting subsystem off of line voltage with reduced link voltage-induced ripple and flicker.

SUMMARY OF THE INVENTION

In at least one embodiment, a light emitting diode (LED) lighting system includes a switching power converter having an input for coupling to an alternating current (AC) power source, an output, and a switch. The LED lighting system also includes an LED lighting subsystem coupled to receive power from the output of the switching power converter. The LED lighting subsystem includes a current source for one or more LEDs, and the current source has a control node and a sense node. The LED lighting system additionally includes a switch state controller coupled to the switching power converter and coupled to the LED lighting subsystem. The switch state controller controls switching of the switch and varies a control current provided to the control node of the current source based on at least a parameter sensed from the sense node.

In another embodiment, a LED lighting subsystem includes one or more LEDs and a current source for the one or more LEDs. The current source includes a transistor having a control input coupled to a constant voltage source, a first leg coupled to the one or more LEDs and a second leg. The current source additionally includes a current mirror coupled to the second leg of the transistor. The current mirror has a control node, a sense node indicative of an operating point of the LED lighting subsystem, and a transistor size ratio that determines an LED current provided to the one or more LEDs based on a control current received at the control node.

In another embodiment, a lighting system controller for a LED lighting system illuminating one or more LEDs from AC line voltage receives a link voltage and a feedback signal indicative of an operating point of the LED lighting system. Responsive thereto, the lighting system controller varies a control current provided to a current source that governs current through the one or more LEDs such that ripple in the one or more LEDs is no more than a predetermined amount.

In another embodiment, a method for operating a LED lighting system includes providing a link voltage to a LED lighting subsystem through a switching power converter coupled to an alternating current (AC) power source. The LED lighting subsystem includes one or more LEDs, a sense node, and a current source for one or more LEDs, where the current source has a control node. The current source generates an LED current for the one or more LEDs based on a control current received at the control node of the current source. A control signal that controls switching of a switch of the switching power converter is generated that varies the control current provided to the control node of the current source based on at least a parameter sensed from the sense node.

BRIEF DESCRIPTION OF THE DRAWINGS

FIG. 3 is a timing diagram illustrating optimization of the operating point of a LED lighting system through link voltage regulation.

DETAILED DESCRIPTION OF ILLUSTRATIVE EMBODIMENT

Figure 2:
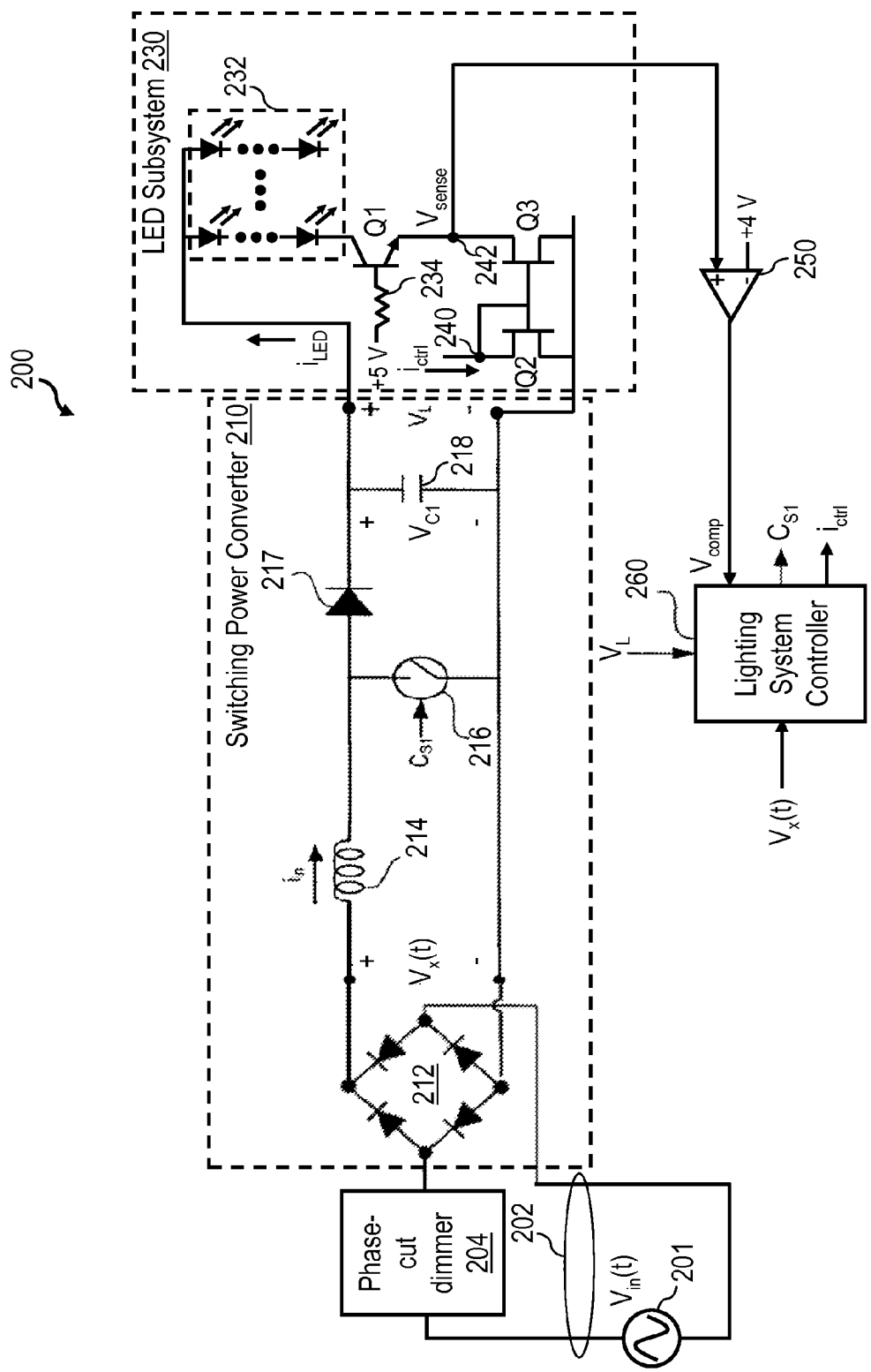
FIG. 2 depicts a representative LED lighting system.

With reference again to the figures and with particular reference to FIG. 2, there is illustrated a high level block diagram of a representative LED lighting system 200 having improved link voltage regulation for optimized operation. LED lighting system 200 is designed to operate off the line and accordingly includes an alternating current (AC) input 202 that may be coupled to a voltage source 201 that supplies AC input voltage $V_{in}(t)$. Voltage source 201 can be, for example, a public utility, in which case, voltage $V_{in}(t)$ can be, for example, a 60 Hz/110 V line voltage in the United States of America or a 50 Hz/230 V line voltage in Europe.

LED lighting system 200 optionally but preferably includes a phase-cut dimmer 204 that enables selection of an average AC input power delivered to the remainder of LED lighting system 200. Although phase-cut dimmer 204 can take various different embodiments, in at least one preferred embodiment, phase-cut dimmer 204 is triac-based, as described in U.S. patent application Ser. No. 13/194,531, referenced above.

LED lighting system further includes a switching power converter 210 coupled to receive AC power from AC power input 202 and phase-cut dimmer 204 (if present) and to output a link voltage $V_L$. Switching power converter 210 includes a full bridge rectifier 212 that rectifies the input voltage $V_{in}(t)$ (as modified by phase-cut dimmer 204, if present) to supply a rectified, time-varying, line input voltage $V_x(t)$. An exemplary input waveform of $V_x(t)$ as modified by a phase-cut dimmer 204 implementing leading edge (forward phase) dimming is illustrated at reference numeral 300 of FIG. 3. In other embodiments, phase-cut dimmer 204 can implement trailing edge (reverse phase) dimming, which truncates the trailing edge rather than the leading edge of the input AC voltage waveform.

Figure 1:
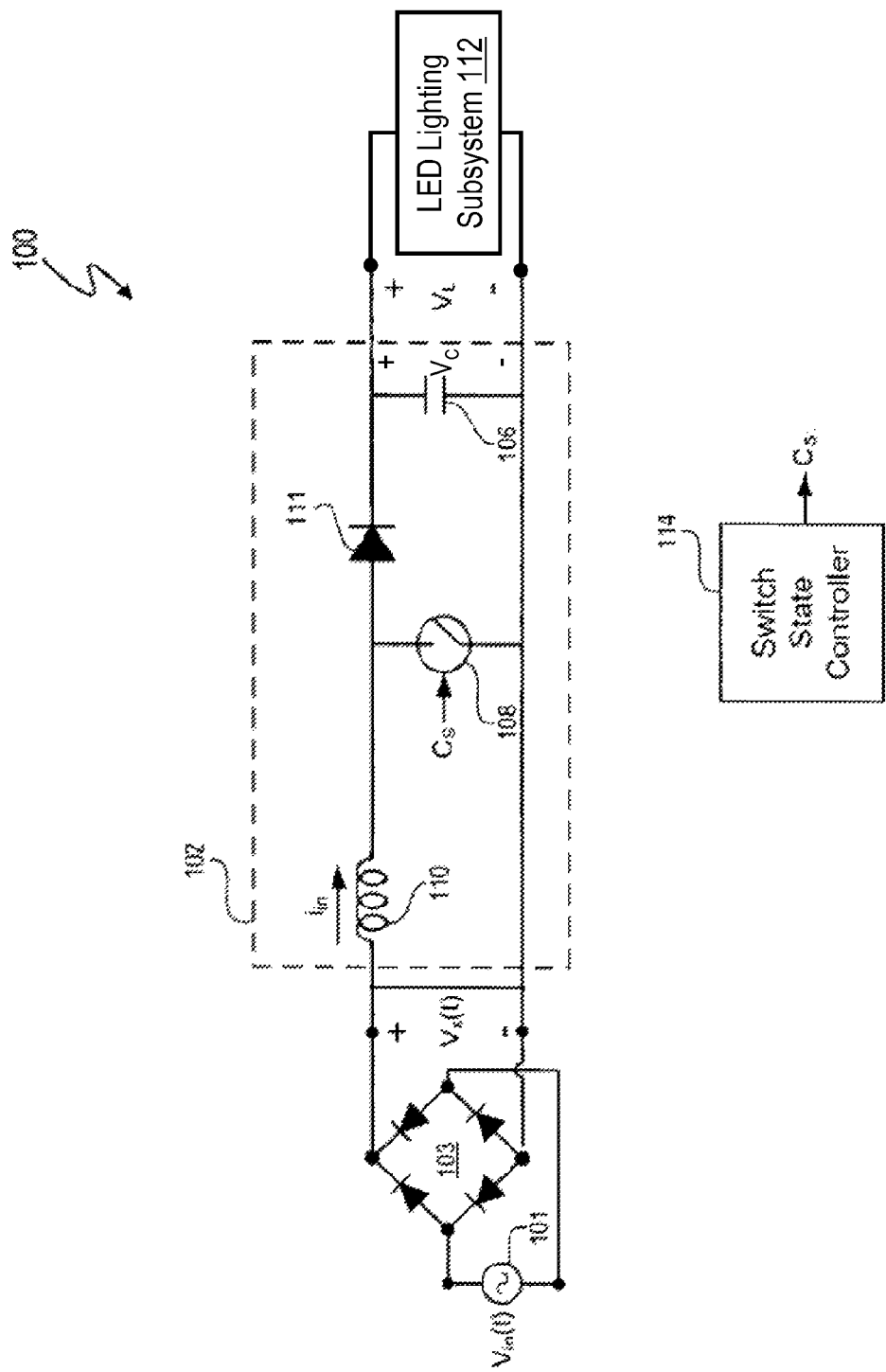
FIG. 1 illustrates a representative prior art LED lighting system.

Similar to switching power converter 102 of FIG. 1, switching power converter 210 includes a switch 216 that turns "on" (conducts) and turns "off" (nonconductive) in response to a control signal $C_{S1}$ in order to regulate the transfer of energy from the rectified, time-varying input voltage $V_x(t)$, through an inductor 214 to a capacitor 218. When switch 216 is "on," inductor 214 energizes with the current $i_{in}$ from full-bridge diode rectifier 212. When switch 216 is "off," inductor 214 drives current $i_{in}$ to charge capacitor 218 through diode 217, which prevents reverse current flow from capacitor 218 into inductor 214. An exemplary waveform of $i_{in}$ is illustrated at reference numeral 302 of FIG. 3. Capacitor 218 preferably has sufficient capacitance to maintain an approximately constant capacitor voltage $V_{C1}$ (for a given input voltage $V_x(t)$) while providing current to a load. In at least some implementations, switching power converter 210 is a boost-type converter in which capacitor voltage $V_{C1}$ is greater than the peak of input voltage $V_x(t)$.

The input current $i_{in}$ flowing through inductor 214 is proportionate to the "on-time" of switch 216, and the energy transferred by switching power converter 210 to capacitor 218 is proportionate to the switch "on-time" squared. In at least one representative embodiment, control signal $C_{S1}$ is a pulse-width modulated (PWM) signal, and switch 216 is an n-channel field effect transistor (FET) that conducts (is "on") when $C_{S1}$ is high and does not conduct (is "off") when $C_{S1}$ is low. Thus, in this embodiment the "on-time" of switch 216 is determined by the pulse width of control signal $C_{S1}$, and the energy transferred to capacitor 218 is proportionate to a square of the pulse width of control signal $C_{S1}$.

Still referring to FIG. 2, LED lighting system 200 includes an LED subsystem 230 coupled to the output of switching power converter 210. LED subsystem 230 includes one or more individual series-connected LEDs or one or more parallel-coupled strings of LED(s), generally depicted at reference numeral 232. The light output by LED(s) 232 is determined by the LED current $i_{LED}$ supplied to LED(s) 232.

LED(s) 232 are further coupled in series with a current source in LED subsystem 230. In the depicted representative embodiment, the current source includes an NPN power transistor Q1 cascaded at its emitter with a current mirror formed by transistors Q2 and Q3. Power transistor Q1 is unswitched during normal operation (i.e., after power has been supplied to the LED lighting system 200 and any initial voltage or current transients have subsided), with its gate coupled via resistor 234 to a first DC reference voltage, such as 5 V. The current mirror includes a control node 240 to which a control current $i_{ctrl}$ is supplied, and a sense node 242 at the collector of power transistor Q1 at which a sense voltage $V_{sense}$ is sensed. The current mirror determines LED current $i_{LED}$ based on the control current $i_{ctrl}$ in accordance with the ratio of sizes of transistors Q3 and Q2 as follows:

$$i_{LED} = i_{ctrl} \times \text{size}(Q3)/\text{size}(Q2)$$

An exemplary waveform of $i_{LED}$ is illustrated at reference numeral 306 of FIG. 3.

LED lighting system further includes a feedback circuit to enable control of the operating point of LED lighting system 200. In the depicted embodiment, the feedback circuit is implemented with a comparator 250 that compares the sense voltage $V_{sense}$ present at sense node 242 of LED subsystem 230 with a second DC reference voltage, such as 4 V. The resulting feedback signal $V_{comp}$ represents with its amplitude and duration the present operating point of LED lighting system 200.

As further depicted in FIG. 2, LED lighting system 200 includes a lighting system controller 260, which may be implemented, for example, in digital or analog circuitry or a combination thereof and may further be implemented as an integrated circuit (IC) (which may optionally additionally include one or more other components of LED lighting system 200). In addition to feedback signal $V_{comp}$, lighting system controller 260 is coupled to receive time-varying input voltage $V_x(t)$ and link voltage $V_L$. Based on these inputs, lighting system controller 260 controls control current $i_{ctrl}$ and the pulse width and period of control signal $C_{S1}$. Specifically, lighting system controller 260 determines and outputs the appropriate control current $i_{ctrl}$ to set LED current $i_{LED}$ at an approximately constant level, where the approximately constant level corresponds to the dimming level of phase-cut dimmer 204. The dimming level of the phase-cut dimmer 204 is indicated by the duration of the "cut" in input voltage $V_x(t)$ relative to the period of input voltage $V_x(t)$. In addition, lighting system controller 260 controls control signal $C_{S1}$ so that link voltage $V_L$ satisfies the voltage requirements of LED subsystem 230 and keeps sense node 242 at a voltage sufficiently high to keep the current source comprising transistors Q1, Q2 and Q3 at least mostly "on" and to thus maintain the desired LED current $i_{LED}$. For efficiency, lighting system controller 260 further preferably selects the target $V_L$ to be low enough so that LED current $i_{LED}$ can just be maintained with less than or equal to a predetermined amount of ripple (which may be zero). An exemplary waveform of $V_L$ is illustrated at reference numeral 304 of FIG. 3.

Thus, lighting system controller 260 controls the nonlinear power transfer process of switching power converter 210 so that capacitor 218 is transferred a desired amount of energy that satisfies the voltage and current requirements of LED subsystem 230. The duty cycle of control signal $C_{S1}$ is set to maintain the desired capacitor voltage $V_{C1}$ (e.g., between 200 and 400 V) and load voltage $V_L$, and in at least one embodiment, the duty cycle D of control signal $C_{S1}$ equals $[V_L/(V_{C1}+V_L)]$.

Energy transfer increases during a period of time as the input voltage $V_x(t)$ increases. To regulate the amount of energy transferred and maintain a power factor from 0.7 to close to one, lighting system controller 260 varies the period of control signal $C_{S1}$ so that the input current $i_{in}$ tracks the changes in input voltage $V_x(t)$ and holds the capacitor voltage $V_{C1}$ substantially constant. For example, in one embodiment, switch 216 is controlled so that input current $i_{in}$ is linearly proportional to input voltage $V_x(t)$. Thus, as the input voltage $V_x(t)$ increases, lighting system controller 260 increases the period T of control signal $C_{S1}$, and as the input voltage $V_x(t)$ decreases, lighting system controller 260 decreases the period T of control signal $C_{S1}$. At the same time, the pulse width PW of control signal $C_{S1}$ is adjusted to maintain a constant duty cycle D, and thus, hold capacitor voltage $V_{C1}$ substantially constant. In at least one embodiment, lighting system controller 260 updates control signal $C_{S1}$ at a frequency much greater than the frequency of input voltage $V_x(t)$. Because input voltage $V_x(t)$ is generally a rectified line voltage of a public utility, the frequency of input voltage $V_x(t)$ is generally 50-60 Hz. The frequency 1/T of control signal $C_{S1}$ is, for example, between 25 kHz and 100 kHz. Frequencies at or above 25 kHz avoid audio frequencies and at or below 100 kHz avoid significant switching inefficiencies while still maintaining good power factor correction (e.g., between 0.7 and 1) and an approximately constant capacitor voltage $V_{C1}$. Lighting system controller 260 may trade off power factor for efficiency.

In some embodiments, LED lighting system 200 may receive excess input energy and therefore need to shed excess energy through its components. Techniques for discarding excess energy through the components of a LED lighting system are described, for example, in U.S. Patent Application Ser. No. 61/410,168, referenced above. It should be noted that one component that can be utilized to discard excess energy in accordance with the disclosed techniques is power transistor Q1, which can discard excess energy by making load voltage $V_L$ higher than necessary.

As has been described, in one embodiment, light emitting diode (LED) lighting system includes a switching power converter having an input for coupling to an alternating current (AC) power source, an output, and a switch. The LED lighting system also includes an LED lighting subsystem coupled to receive power from the output of the switching power converter. The LED lighting subsystem includes a current source for one or more LEDs, and the current source has a control node and a sense node. The LED lighting system additionally includes a switch state controller coupled to the switching power converter and coupled to the LED lighting subsystem. The switch state controller controls switching of the switch and varies a control current provided to the control node of the current source based on at least a parameter sensed from the sense node.

While the present invention has been particularly shown as described with reference to one or more preferred embodiments, it will be understood by those skilled in the art that various changes in form and detail may be made therein without departing from the spirit and scope of the invention.

What is claimed is:

1. A light emitting diode (LED) lighting subsystem, comprising:
   one or more LEDs;
   a current source for the one or more LEDs, the current source including:
      a transistor having a control input coupled to a constant voltage source, a first leg coupled to the one or more LEDs and a second leg; and
      a current mirror coupled to the second leg of the transistor, the current mirror having a control node, a sense node indicative of an operating point of the LED lighting subsystem, and a transistor size ratio that determines an LED current provided to the one or more LEDs based on a control current received at the control node.

2. The LED lighting subsystem of claim 1, wherein the one or more LEDs include multiple parallel coupled strings of LEDs.

3. The LED lighting subsystem of claim 1, wherein the transistor is a NPN transistor.

4. An apparatus comprising:
lighting subsystem of claim 1;
a feedback circuit coupled to the sense node; and
a lighting system controller that supplies the control current to the control node of the current mirror.

5. The apparatus of claim 4, wherein the lighting system controller varies the control current provided to the control node based on an amount of dimming applied to the one or more LEDs by a phase-cut dimmer.

6. The apparatus of claim 4, wherein the switch state controller varies the control current provided to the control node to constrain current ripple in the one or more LEDs to no more than a predetermined amount.

7. A lighting system controller for a light emitting diode (LED) lighting system illuminating one or more LEDs from AC line voltage, wherein the lighting system controller receives a link voltage and a feedback signal indicative of an operating point of the LED lighting system, and responsive thereto, varies a control current provided to a current source that governs current through the one or more LEDs such that ripple in the one or more LEDs is no more than a predetermined amount.

8. The lighting system controller of claim 7, wherein the lighting system controller comprises an integrated circuit.

9. The lighting system controller of claim 7, wherein the lighting system controller further receives as an input a signal indicative of phase-cut dimming applied to the LED lighting system, and responsive thereto, varies the control current based on the signal indicative of phase-cut dimming.

10. The lighting system controller of claim 9, wherein the signal indicative of phase-cut dimming is a rectified input voltage of the LED lighting system.

* * * * *